Aug. 13, 1968     C. K. BAREFOOT     3,397,099
METHOD AND APPARATUS FOR REBUILDING TIRES
Filed Aug. 24, 1964     4 Sheets-Sheet 1

INVENTOR.
CARLTON KEITH BAREFOOT
BY
ATTORNEYS

United States Patent Office 3,397,099
Patented Aug. 13, 1968

3,397,099
METHOD AND APPARATUS FOR
REBUILDING TIRES
Carlton Keith Barefoot, Muncie, Ind., assignor to Bacon American Corporation, Muncie, Ind., a corporation of Indiana
Continuation-in-part of abandoned application Ser. No. 313,806, Oct. 4, 1963. This application Aug. 24, 1964, Ser. No. 393,001
13 Claims. (Cl. 156—96)

ABSTRACT OF THE DISCLOSURE

Tires are recapped by spreading the beads of a prepared tire carcass or body to reduce the circumference to a particular dimension and by pre-cutting the tread stock to the same dimension. The tread stock is then applied to the carcass, fitting exactly therewith, without need for further cutting of the tread stock. The tire, after vulcanizing, has a more uniform tread thickness and is of higher, more uniform quality.

---

This application is a continuation-in-part of my copending application Ser. No. 313,806, filed Oct. 4, 1963, now abandoned.

This invention relates to a method and apparatus for rebuilding tires of the type used on automotive vehicles.

One of the problems facing the tire rebuilding or retreading industry has been the variation in size between tires of the same nominal size made by different manufacturers, or even by the same manufacturer in different grades. In the past the retreader has selected his matrix based entirely on the size indication that appears on the tire body or casing and has made little or no correction for deviations in tire diameter. For example, a 7.50 x 14 tire of one manufacturer may measure 27 inches in diameter, while that of another manufacturer may measure 26 inches, and a tire of a third manufacturer may measure only 25 inches. In terms of circumference, then, a nominally 7.50 x 14 tire may range from approximately 79 inches to as much as 85 inches. Under present systems, all nominal 7.50 x 14 tires would be retreaded in the same matrix, and since the matrix is of fixed dimensions, it is apparent that there will be a wide variation in the quality of the retreading that can be done on the tires because of the difference in the length of the tread stock that is applied to the large and small tires. If the 26 inch tire has the new tread stock applied in a relaxed condition, the thickness of the new tread will be greatly reduced by stretching the tire to fit a 27¾ inch matrix, for example. In some cases the reduction in thickness is so severe that no "undertread" rubber is left on the retreaded tire. Further, while the vulcanized tires have substantially the same final diameter, initially they will have had different lengths of retread stock applied thereto varying from 79 inches to 85 inches, a difference of ½–1 pound of rubber. The present invention is directed to a method and apparatus for assuring uniform quality of the retreaded tire by applying the same length of tread rubber and by curing to a uniform diameter.

One of the first steps that is taken to prepare a tire for retreading is called "buffing." In this step, the tire is placed on a rotating machine and the old rubber is rasped away from the tire to a predetermined shape that is determined by a template supplied for each matrix. This template supposedly fits the tire to the matrix in which the retreading stock is to be vulcanized, but, in fact, the use of the template merely establishes the cross section of the tire and does not establish a uniform diameter for all tires. A large diameter tire will still retain its large diameter, and a small diameter tire will retain its small diameter even after buffing, even though the cross-sectional shape of the two tires from bead to bead will be very closely the same if the template is properly used. Any attempt to buff to a uniform diameter with present machines may result in exposing the fabric on a large tire and removing insufficient rubber from a small tire.

After buffing, the tire is placed on a tread building machine for the purpose of applying new rubber to the buffed surface of the tire. This is done by spraying the buffed surface with a rubber cement and then applying a strip of unvulcanized rubber or camelback to the tire carcass and "stitching" it down by applying pressure, commencing in the center of the unvulcanized stock and pressing equally outwardly toward the wings or shoulders of the tread stock. In present processes the camelback is taken from a strip that is either continuous or is considerably longer than necessary to completely surround the carcass and a butt or skived joint is made between the ends of the camelback on the periphery of the tire. A skilled operator can in most instances make a satisfactory joint, but it is not unusual for this joint to cause difficulty due to improper cutting. The present invention includes the provision of means to improve the joint between the ends of the applied tread stock so that complete uniformity of adherence and complete elimination of air pockets are assured, and also improves the joint because a predetermined length of tread stock is applied to a tire that has been brought to a predetermined circumference and there is never too much or too little rubber applied.

It is thought that the failure of adherence of the new tread rubber and the old carcass is caused primarily by heat build-up at the interface to the point where the vulcanized rubber actually becomes somewhat gummy and loses its physical properties. Rubber, as any other material, exhibits a hysteresis effect in that cyclic energy applied thereto is not completely dissipated, but is, in part, retained at each cycle of operation. The cyclic application of energy occurs in a tire at each revolution of the tire against the road and depends on the speed of rotation, the load on the tire, its condition of inflation and several other factors. It is known that a tread wave exists in a tire as it rotates which comprises the accumulation of rubber in a deformed state on the leading edge of the road-engaging surface. This deformation exists only momentarily at any point and extends in the peripheral direction of the tire and is believed to be the major cause of the tire heating up. The present invention applies a constant length of tread stock to all tire casings of a given nominal size so that tires of longer circumference will not receive an excess amount of retread stock. The constant length of retread stock used preferably is less than the average circumference of tires of a given nominal size so that less rubber is available, on the average, to deform into the objectionable tread wave.

The present invention is directed to a method and apparatus for rebuilding tires in which tires of the same nominal size are retreaded to the same actual diameter irrespective of variations in either direction from the actual diameter at the time the tire is rebuilt or retreaded. Thus all nominally 7.50 x 14 tires are rebuilt to the same actual diameter which preferably is less than the average diameter of tires of the same nominal size and can even be slightly less than the minimum diameter that occurs with the great majority of the tires of the same marked or nominal size. Further, the present invention provides the same amount of new tread stock, both in width and length, for tires of the same nominal size.

In one form, the invention also provides an improved joint between the ends of the applied tread stock which will substantially eliminate splicing failures and imbalance at the splice point that have plagued the industry in the past.

It has been recognized that the diameter of a tire can be, and frequently is, adjusted by moving the beads axially of the tire. The diameter can be increased slightly by moving the beads toward one another and can be reduced by spreading the beads apart. Such spreading, however, if carried far enough is accompanied by a deformation of the periphery of the tire to a wavy configuration in which the tire is not round but exhibits areas of depression. The present invention, in establishing the uniform diameter may deform the tire to the extent that waves in the periphery might occur, but provision is made for restoration of a perfectly round, uniform surface against which the new tread stock is adhered or stitched.

One of the known, and widely used, methods of retreading tires has been to vulcanize the new tread stock to the properly prepared tire body in a small sized matrix or band, the diameter of which corresponded to the theoretical "rolling radius" of the tire. The rolling radius was calculated on the basis of measuring the distance between the center of rotation and the road surface with the tire inflated and under load conditions. In this process, however, the tread stock was applied to the casing or tire body in a relaxed condition and was considerably longer than necessary if the vulcanization were actually to the "rolling radius." No attempt was made to apply the tread stock with the diameter of the tire reduced. All reduction in diameter was expected to take place in the vulcanizing band. Contrasted with this, in the present invention, the tread stock is applied to a tire body while the body is held to a fixed, predetermined diameter and curing takes place in a matrix or mold the diameter of which bears a predetermined relationship to the diameter of the tire at the time of application of the tread stock. Thus, all tires of the same nominal size receive the same amount of tread stock and are cured in matrices of the same diameter approximating, or fitted to the diameter of the tire at the time of application of the tread stock. If the diameter of the tire body is reduced prior to the application of the tread stock, the result is that the tread of the tire is prestressed after vulcanization when the tire again attempts to expand to its normal diameter after removal from the matrix.

While under ideal circumstances the matrix size chosen for use with the machine of the present invention has a diameter below the range of diameters normally associated with tires of a given nominal diameter, the invention is also applicable to existing matrices. For example, an existing 7.50 x 14 matrix may have a circumference of about 81 inches or 81½ inches. An operator wishing to utilize his existing equipment would adjust the machine of the present invention to bring all tires processed therein to accept a slightly lesser amount, for example 80 inches, of tread stock. By far the greater percentage of all tires to be put through the machine will require that the beads be separated and the tire diameter reduced to achieve this dimension. A few (perhaps 1 percent to 5 percent) will require that the beads be brought toward one another to enlarge the diameter to the point where 80 inches of tread stock can be applied. Some tires are so small that even by compressing the beads to the extent that they nearly touch, the diameters still will not be large enough. In such an instance, these tires are processed as tires of a smaller nominal size, 7.00 x 14, for example.

An important object of the invention, therefore, is the provision of a novel method of retreading or rebuilding tires having the same nominal size and average diameter but which in fact vary above and below said diameter, which comprises controlling a tire body to a selected or predetermined diameter, inflating said body while in its constant diameter state to assure a circular peripheral form, attaching a predetermined length of tread stock to said body while inflated, and curing said tread stock in a matrix, the diameter of which is fitted to the uniform diameter of the tire body. In a preferred form, the predetermined diameter to which the tire bodies are held is less than the average diameter of the normal range of tires of a given nominal size, and may be even at or below the bottom end of the range. The term "normal range" as used herein refers to the range of diameters in which fall most, perhaps 95 to 99 percent, of the tires of a given nominal size. If the diameter of a tire of a given marked size falls below the normal range, it can be finished in a smaller matrix.

The attached drawings show an apparatus embodying the present invention, and suitable for carrying out the method of the present invention. A detailed description of the drawings will bring out further objects and advantages that derive from the present invention.

Figures 1, 2, 11:
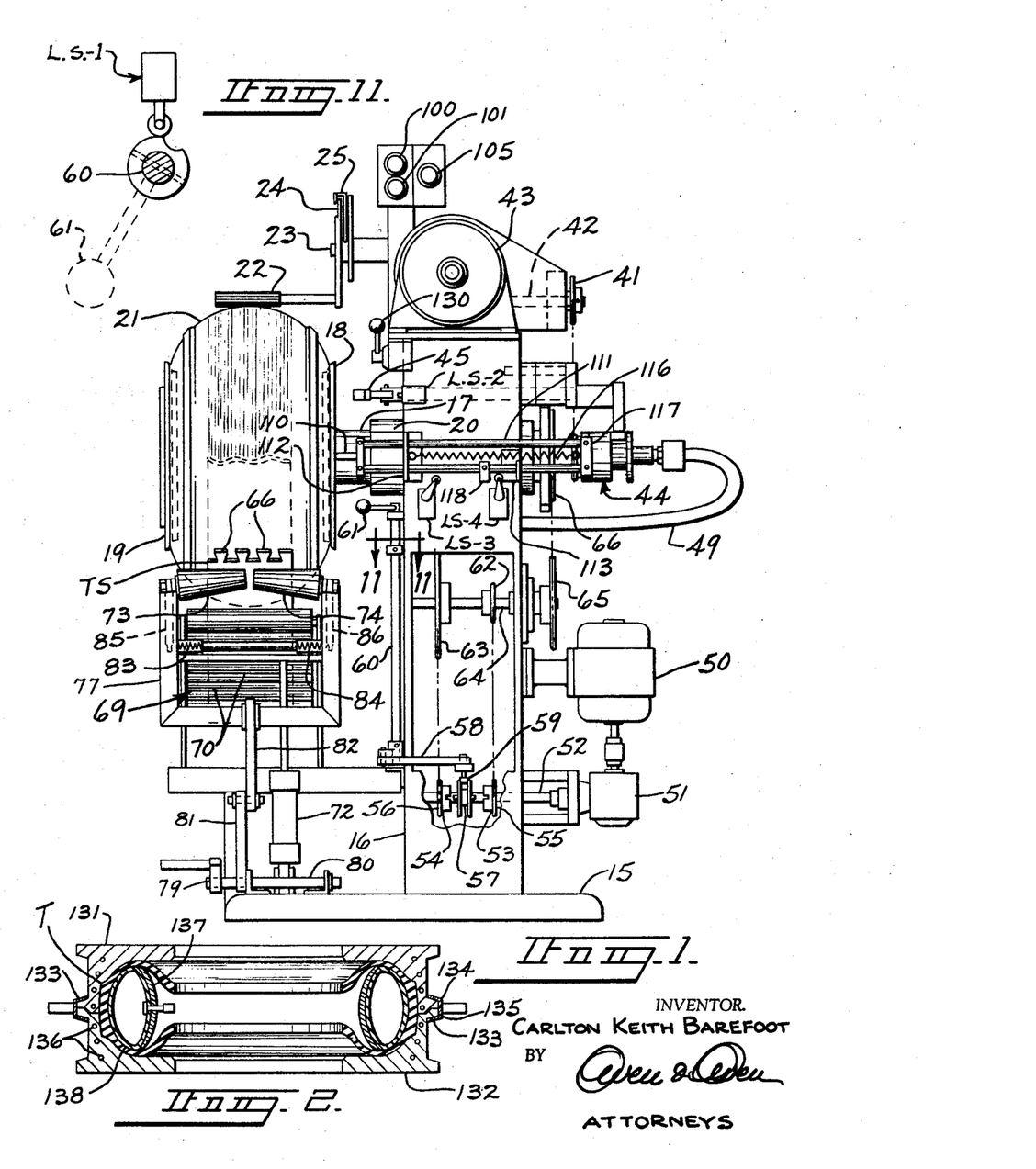
FIG. 1 is a side elevational view of an apparatus embodying the present invention, and capable of carrying out the method thereof, showing a tire mounted in operating position to receive a new tread stock.
FIG. 2 is a somewhat diagrammatic cross-sectional view of a matrix in which a prepared tire body is cured after removal from the apparatus shown in FIG. 1.
FIG. 11 is a fragmentary section taken on line 11—11 of FIG. 1.

Referring to the drawings, and particularly to FIG. 1, a machine embodying the present invention is shown as comprising a base 15 having an upright 16 on which most of the mechanism is supported. An arbor 17 projecting forwardly from the upright has an inner bead plate 18 and an outer bead plate 19 mounted thereon. The bead plates can be moved toward or away from one another by a mechanism which will be hereinafter described, and the entire arbor can be rotated in a bearing sleeve 20 in the upright 16.

A tire body 21 is shown mounted in position between the inner and outer bead plates, and the illustration shows the tire in its expanded position with tread rubber being applied thereto.

The tire 21, prior to mounting on the machine of the present invention, has been rasped or buffed in the areas to which new tread rubber is to be applied. As is known in the art, this tread rubber may extend over only the road engaging surface or may extend down partially over the shoulders of the tire body and in rare instances even to the beads thereof.

The diameter of the tire body is sensed by a feeler arm 22 pivoted at 23 and having a pointer 24 at its far end, the pointer cooperating with a scale 25 to indicate directly to the operator the radial distance between the center of the tire mounting elements and the periphery of the tire to which the tread stock is being applied.

Figures 4, 5:
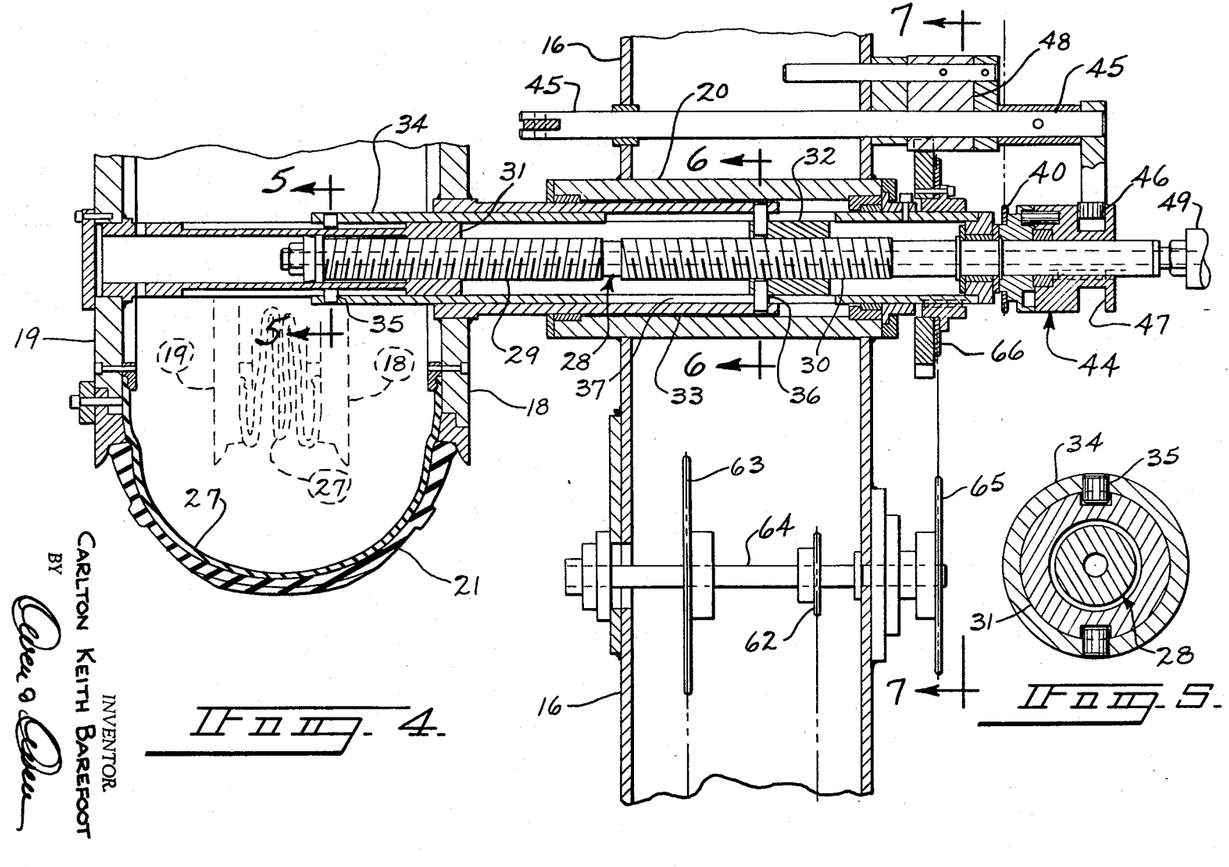
FIG. 4 is a fragmentary sectional view taken on line 4—4 of FIG. 3.
FIG. 5 is an enlarged, sectional view taken on line 5—5 of FIG. 4.

FIG. 4 shows the tire 21 having its inner and outer beads engaged by the inner and outer bead plates 18 and 19. It will be noted that the contour of the tire body is substantially distended from its normal, relaxed position. In some instances, this distension is sufficient to buckle the periphery of the tire. To overcome this, the interior of the tire body can be subjected to pressure, such as air pressure. The air can be supplied directly to the interior of the tire body or through the intermediary of a bag or the like. As shown, a contour-maintaining, inflatable bag 27 is provided which is affixed to the inner and outer bead plates 18 and 19 in any suitable sealed joint so that it can contain a substantial air pressure for the purpose of forcing the tire to a round, continuous periphery to which the new tread stock may be applied. If the bag 27 is not used, the beads of the tire body can be sealed directly on the edges of the bead plates 18 and 19, with air being supplied to aid in the sealing.

The inner and outer bead plates 18 and 19 are moved toward or away from one another by a lead screw 28 having a series of right-hand threads 29 and a series of left-hand threads 30. The series of right-hand threads are engaged by a follower nut 31 fixed at its far end to the outer bead plate 19, while the series of left-hand threads 30 are engaged by a follower nut 32 which is, in turn, fixed to a sleeve 33 and in turn to the inner bead plate 18. Sliding motion between sleeve 20 and the driving nut 31 for the outer bead plate 19 is assured by a drive sleeve 34 having inwardly projecting pins 35 which engage in slots in the sleeve-like extension of the nut 31 to prevent the nut 31 from turning, but force the nut along the right-hand lead screw portion 29, and thus move the outer bead plate 19 in or out with respect to the inner bead plate 18 and to the center line of the tire 21. Similarly, the operating nut 32 is constrained to a reciprocating movement by inwardly directed pins 36 carried by the sleeve 33 and which engage the nut 32 and pass through slots 37 in the drive sleeve 34. It will thus be seen that rotation of the screw 28 in one direction will cause the bead plates 18 and 19 to approach each other, while rotation in the opposite direction will cause the bead plates 18 and 19 to move apart.

The drive for the lead screw 28 is taken at the rear end thereof from a sprocket 40 to which a chain connection is made to a driving sprocket 41 on the end of a gear reducing shaft 42 driven by an appropriate reversible electric motor 43.

Figures 8, 10:
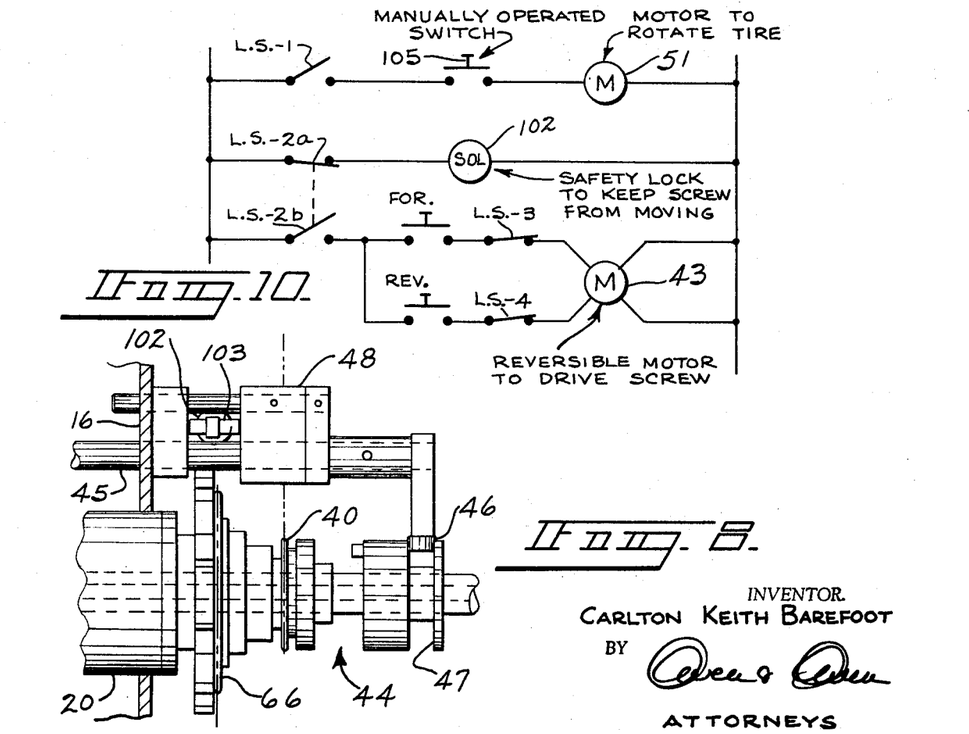
FIG. 8 is a fragmentary view in elevation of a portion of the apparatus shown in FIG. 4.
FIG. 10 is an electrical circuit diagram for the operating motors and safety devices of the illustrated machine.

A clutch 44 is keyed to and slidably mounted on the outer end of the screw 28, and is provided with a throw-out arm 45 having a finger 46 entering a groove 47 in the outer end of the clutch body. Movement of the throw-out arm 45 to the right in FIG. 4 will disengage the clutch 44, and move the parts to the position shown in FIG. 8. Thus, even though the drive motor 43 may continue to run, no movement will be imparted to the lead screw 28 since the clutch 44 is disengaged and sprocket 40 is freely mounted on the end of the lead screw.

The screw 28 is made hollow throughout its length so that air may be introduced from a pipe or tube 49 through a central passage within the screw 28 to the interior of the tire body or the air bag 27, if used. Air is admitted from the pipe 49 under the control of an appropriate valve 52 (FIG. 9) as hereinafter described.

During operation of the lead screw 28, the drive sleeve 34, and hence the arbor sleeve 20, are fixed against rotation in any suitable manner so that the reaction force resulting from operation of the lead screw may be taken into the upright 16. For this purpose any suitable blocking device may be used, but in the form shown in the drawings, a blocking dog 48 is carried by the shifting lever 45 for the clutch 44 and when the clutch is engaged the blocking dog 48 is interposed between stop fingers for the arbor driving sprocket which will be hereinafter described.

While other mechanisms may be used to cause the bead plates 18 and 19 to approach and retract from each other, the positive drive afforded by the screw sections 29 and 30 and their cooperating nuts is preferred because it is important that the center line of the tire body carried by the bead plates be maintained in a constant plane. By maintaining the center line in a constant position, it becomes possible to apply new tread stock to the periphery of the tire evenly with respect to the center line without the necessity of the operator visually aligning the center of the tread stock with the center of the tire.

When clutch 44 is disengaged so that there is no longer any driving force into the lead screw 28, the tire and its supporting elements can be rotated from an electric motor 50 mounted on the upright 16 and driving a reduction gear 51 and a drive shaft 52 which carries high and low speed clutch elements 53 and 54 each of which carries a driving sprocket 55, 56 respectively. A center clutching member 57 keyed to shaft 52 can be moved forwardly or rearwardly to engage the clutch elements 53 or 54, such movement being under the control of a shifting lever 58 having the usual fork 59 in engagement with the movable clutch element 57. Lever 58 is controlled by a vertical shaft 60 having a conveniently located control knob 61 at its upper end. Shifting the knob 61 from side-to-side causes the shifting fork 59 to engage the movable clutch element 57 with either of the driven clutch elements 53 or 54 depending on the position of the movable clutch element.

Sprocket 55 is connected by an appropriate chain to a high speed sprocket 62, while sprocket 56 is connected by a similar appropriate chain to a low speed sprocket 63. Both sprockets 62 and 63 are keyed to a back shaft 64 having a sprocket 65 at the rear end thereof, and journaled in appropriate bearings in the upright 16. Sprocket 65 is connected by an appropriate chain to a sprocket 66 on the arbor 17, being keyed to the drive sleeve 34. A tire body mounted on the arbor between the bead plates may thus be turned at low or high speed, at the selection of the operator.

In accordance with the invention, unvulcanized tread stock is cut to a predetermined length for application to the tire, with all tires of the same nominal size controlled to the same circumference by a greater or lesser separation of the bead plates 18 and 19. The operator gauges the actual diameter of the tire by inspection of the indicator pointer 24 on its cooperating scale 25 so that the tire circumference will equal the tread stock length. Because the tread stock length preferably is less than the average circumference of the tire bodies of a given nominal size, and may be even at the lower end of or below the normal circumference range, the majority, if not substantially all, of the tire bodies will be reduced in diameter and circumference. This is accomplished by spreading the bead plates 18 and 19 with the air pressure thereby spreading the sidewalls and the beads of the tire body. If the diameter and circumference need be increased slightly, this is accomplished by moving the bead plates 18 and 19 toward one another to move the beads accordingly.

At the time the tread stock is pre-cut, provision may be made for an interlocking joint between the two ends of the tread stock as indicated in FIG. 1, if desired. Thus, each end may be given a configuration to include interfitting, dovetailed extensions 66 that are joined together to resist separation, once the tread rubber has been applied to the tire carcass. In normal operation, a conventional butt joint may also be used, and since the length of tread stock is predetermined, all joints will be equally good and there is no judgment required by the operator as to how much stock to cut from his supply roll.

Prior to application of the tread rubber, the tire will have been sprayed in the normal manner with adhesive (either on the machine above described or on a separate machine of known form) and the tread stock is placed on a horizontal conveyor 69 comprising a series of idler rollers 70. Suitable adjustable guide fingers 71 maintain the length of tread stock in the proper lateral position on the conveyor with the center of the tread stock precisely in the center of the tire to which it is to be applied. The conveyor 69 is pivoted at one end and can be raised by any suitable mechanism such as an air cylinder 72 to a point where the last roller 70 of the conveyor supports the tread stock at the point of tangency to the tire 21, and presses the tread stock against the tire body. The strip is thus fully supported to the time it is applied to the tire body so that it cannot stretch or be deformed. Also, the fingers 71 assure that the strip is applied straight and that the strip, and especially the trailing end, cannot waver or "fishtail" when being applied to the tire body. For this purpose, a number of the fingers 71 are used and the last pair is positioned close to the tire body.

Figures 3, 6, 7:
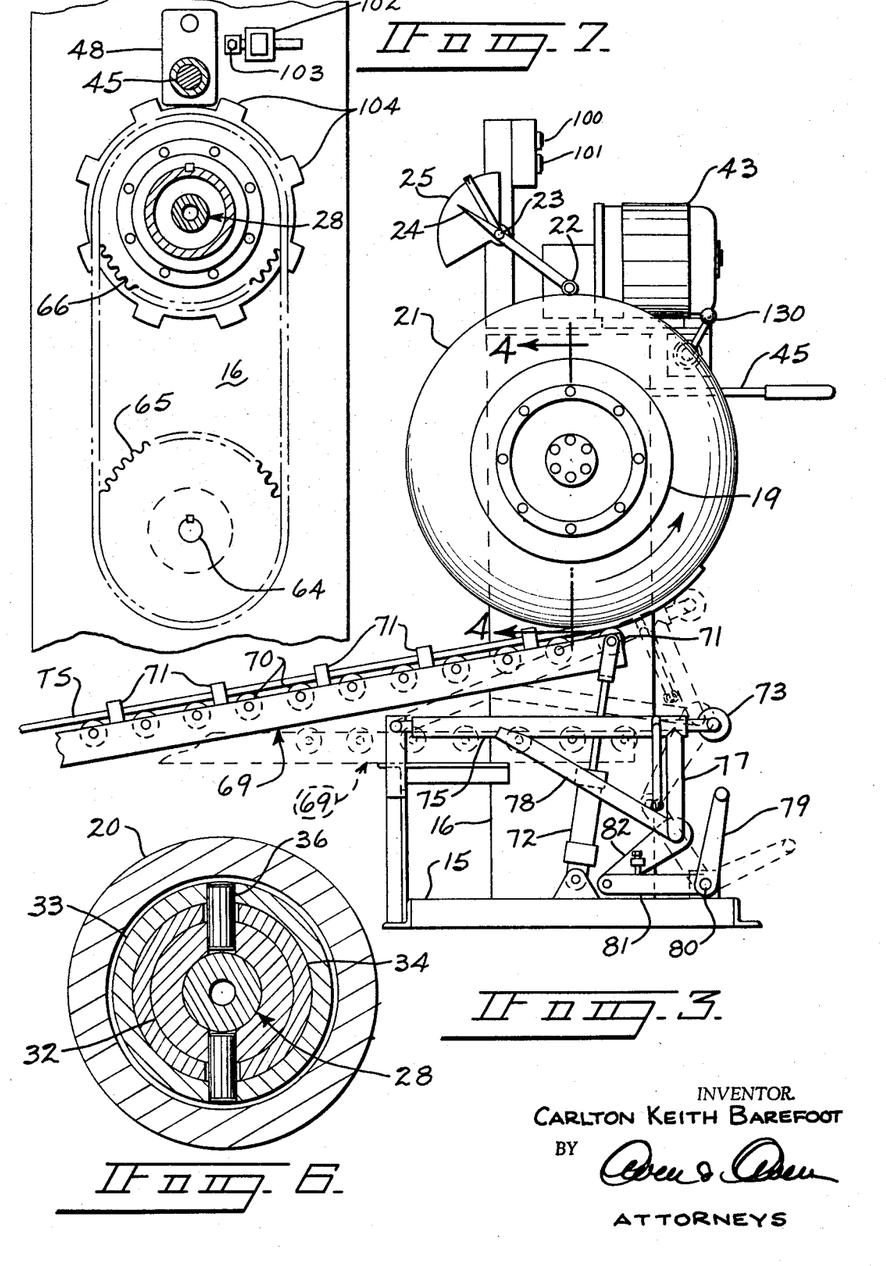
FIG. 3 is a somewhat fragmentary front elevational view of the machine shown in FIG. 1.
FIG. 6 is an enlarged, sectional view taken on line 6—6 of FIG. 4.
FIG. 7 is an enlarged, sectional view taken on line 7—7 of FIG. 4.

In FIGS. 1 and 3, the tread stock is designated TS. When the tire body has been mounted, sprayed with cement in preparation for receiving the tread stock, and held at the proper diameter, the operator begins to feed the stock TS into position over the tire body by rotating the body at low speed. Once the tread stock is in position around the tire body, and held in place by the adhesive bond at its center area, the present invention provides a stitching mechanism to complete the adhesive placement of the tread stock on the tire. The stitching mechanism may take various forms, but as shown in the drawings, it includes stitching rollers 73 and 74. A treadle mechanism is provided to move the rollers 73, 74 from a disengaged position to a position in which they exert substantial pressure against the tire. This treadle mechanism includes (FIG. 3) spaced frames 75 in which the mounting stems of the rollers are received, pivoted to a supporting frame 76 and including downwardly extending arms 77 on each side of the conveyor and under each of the respective rollers 73, 74. A brace 78 is provided to assure that a proper force may be applied to the frames 75. The frames 75 are moved from the disengaged position to a position in which the rollers 73, 74 force the rubber of the tread stock against the tire by a treadle mechanism comprising a foot treadle 79 in the form of a bell crank lever pivoted at 80 to the base 15 and having an upwardly extending arm 81 pivoted to a link 82, which link is pivoted to the arms 77 of the frames 75. Depression of the treadle 79 causes the links 81 and 82 to move toward a straightened position and to apply force, through the arms 77 to the respective rollers 73, 74.

The rollers 73 and 74, while carried by the frames 75, are mounted on cylindrical and rotatable stems received within the frames 75 and are thus free to partake of a rotary motion with respect to the frames, as well as the upward motion imparted thereto by an upward motion of the frames themselves.

The rollers 73 and 74 are biased by springs 83, 84 which act against depending arms 85 and 86, respectively, each of which is connected to one of the rollers in a direction such that when the rollers 73 and 74 are forced upwardly by the treadle mechanism, the rollers themselves are free to rotate about their mounting stems and apply force to the tread stock beginning at the center and moving toward the edges thereof. This motion is well known in the art and is commonly used in "stitching" mechanisms by which tread stock is applied to retreaded tires.

The present invention includes safety factors by which the operator can be prevented from improperly operating the machine. Since the first operation, after a tire is mounted between the bead plates 18 and 19 is to move the tire beads to establish its pre-selected diameter, the operator first moves clutch lever 45 to engage the clutch 44 and to establish a driving connection from motor 43 through sprocket 41 and sprocket 40 to the drive sleeve 34 in the arbor 17. The closure of clutch 44 thus establishes the driving connection from the sprocket 40 into the screw 28, and if the first operation is to spread the tire beads, a button designated "forward" and numbered 100 in FIG. 1 is pushed. This causes drive motor 43 to turn the screw 28 in such a direction that the bead plates separate. When the operator has moved the shifting lever 45 for clutch 44, a limit switch LS2 having one pair of normally open contacts LS2b and one pair of opposed contacts LS2a is moved to such a position that contacts LS2b are closed so that the motor 43 is completely under the control of the "forward" button 100 and contacts LS2a are opened, the switch operated by button 100 being in series with contacts LS2b. The "forward" button is held closed by the operator until the pre-selected tire diameter is attained, at which time he releases the button and the motor 43 stops. If the diameter of the tire body is to be increased, the bead plates 18 and 19 are moved toward one another by pressing a button 101, designated "reverse."

While the screw is rotated, means must be established by which the reaction force of the screw can be taken into the upright 16. This means comprises a series of peripheral lugs 104 on the driving sprocket 66 for the arbor 17. When the clutch 44 for the lead screw is engaged, block 48 moves between lugs 104 and keeps the reaction elements for the two lead screw nuts 31 and 32 from rotating, assuring a lineal movement of the nuts relative to the screw. When the tire has attained its proper reduction in diameter, it will thereafter be necessary to rotate the arbor so that an interlock is made which, when clutch 44 is disengaged, moves a locking member between the block 48 and an adjacent stationary portion of the machine. The solenoid for moving the locking member is designated 102 in FIGS. 7 and 10 and the locking member itself is designated 103 in FIG. 8. Thereafter, so long as the member 103 remains in its blocking position, drive clutch 44 for the screw can no longer be engaged until the member is withdrawn by deactivation of the solenoid 102.

Having established the proper diameter of the tire, the operator then moves the control lever 61 to a position such that driving element 57 of the low speed clutch is engaged with the low speed driving sprocket 56 which, through its driving chain, drives sprocket 63, the tire rotating sprocket 65 and thence the arbor driving sprocket 66. The tire is thus rotated at low speed. At the time the lever 61 is moved to the low speed drive position, limit switch LS1 is closed so that a manually operated switch 105 can be closed and the tire rotating motor 50 actuated. The new tread stock TS is applied to the tire body while the latter is rotated at low speed.

The present invention incorporates a safety device to prevent the operator from contracting the tire body unduly or bringing the tread plates so close together as to damage the threads 28 and 29. This safety device comprises a feeler finger 110 (FIG. 1) mounted on a frame 111 comprising spaced bars guided in suitable angle guiding members 112 and 113 carried on the machine upright 16. A biasing spring 116 is fastened to the front angle member 112 and to a connecting block 117 extending between the two guiding arms at the rear thereof, so that the spring tends always to urge the frame 111 forwardly and thus to urge the feeler finger 110 against the inner bead plate 18. A switch operating dog 118 depends from the frame 111 and is adjustable with respect to the frame. This dog operates either of two limit switches LS3 and LS4 in the event that the feeler finger indicates that the bead plate 18 has moved beyond a desirable position, either too close together or too far apart. The limit switches LS3 and LS4 are in series with the forward and reverse operating buttons for motor 43 and will open the circuit to the motor even though the operator has maintained the forward or reverse button closed. It is thus not possible for the operator to move the tire bead plates too far apart or too close together and jam threads 29 and 30.

Figure 9:
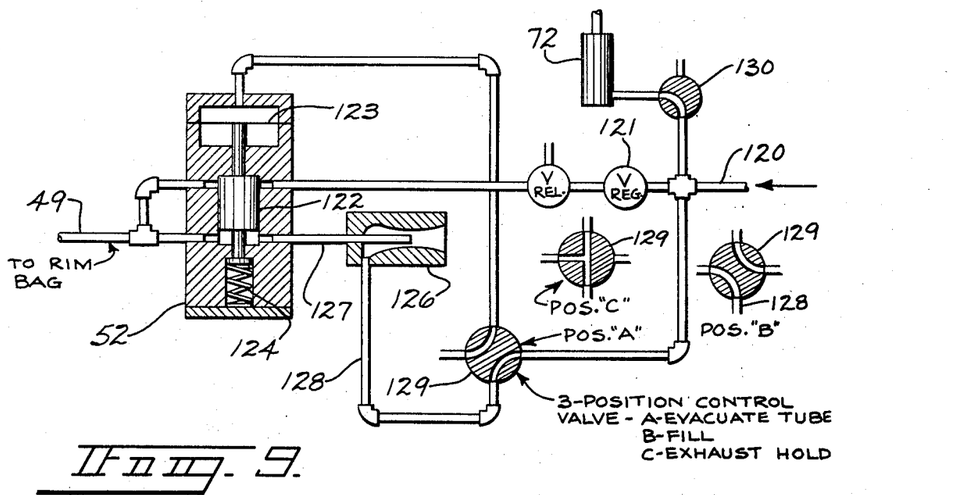
FIG. 9 is a pneumatic circuit diagram.

The pneumatic circuit is shown in FIG. 9 and comprises a source of air pressure 120. A regulating valve 121 is in series in the air pressure line to establish the pressure at which air is supplied to the inflation conduit 49. A plunger valve 122, operated by air pressure above diaphragm 123, is provided which controls the flow of fluid from the regulating valve 121 into the tire inflating line 49, opening communication to the line 49 from the regulated pressure source when in its lower position, and closing such communication when in its upper position. The valve 122 is biased upwardly by a suitable spring 124 and thus normally opens communication between the line 49 and atmosphere.

The communication between the line 49 and atmosphere is established through an air operated venturi eductor member 126. The evacuation line from conduit 49 is designated 127 in FIG. 9 and it will be noted that this line terminates at the throat of the venturi eductor member. Therefore, if air is introduced at high pressure from the source 120 into the rear of the eductor through a line 128 the pressure in line 127 can be reduced below atmosphere, due to the velocity of flow caused by the rapid dispersal of the high pressure air from the eductor. The eductor is not necessary when the bag is not used since negative pressure is no longer required to contract the bag.

Filling and evacuating the bag 27 through line 49 is under control of a three position valve 129, which is actuated by a handle 130 conveniently located on the upright of the machine. The valve 129 is a commercially available unit, and its passages are shown in the three operating positions in the drawings. When the valve is in the position shown at A in FIG. 9, air directly from the supply line 120 passes through valve 129 and pipe 128 to the back of the eductor 126 to evacuate the air bag 27. If the valve 129 is shifted 90° in a clockwise direction, to position B (FIG. 9), communication is established between supply line 120 and the chamber above diaphragm 123, forcing valve 122 to its lower position against the tension of spring 124 and opening communication from the output of the regulating valve 121 to line 49 and thence to the air bag 27. The bag 27 is thus inflated at the regulated pressure determined by the setting of valve 121, which may be adjusted in various ways known in the art.

The valve 129 has an intermediate position, between positions A and B in FIG. 9 which is a "hold" position in which bag 27 is deflated, but no air is being supplied to the venturi eductor 126, the latter being opened to a vent line. This position is shown at C in FIG. 9 and the valve is moved thereto while a tire is being loaded into and removed from the machine of the present invention.

The pneumatic circuit in FIG. 9 also includes a valve 130 to control the flow of actuating air to cylinder 72 to raise the conveyor roller 70 from its lowered, loading position to feeding position in which tread stock is fed to the periphery of a slowly rotating tire.

The description of the operation of the machine and method of retreading tires which comprise the present invention will assume that the tire body has been properly inspected and buffed to the proper contour over the area to which new tread rubber is to be applied. Beginning with the tire in this condition, the operator manually places the tire body between the inner and outer bead plates 18 and 19 and seats the beads on the plates, moving the plates toward one another, if necessary. At the same time, the air can be admitted to the interior of the tire body by the valve 129 to aid in the seating of the beads. The air is at a regulated pressure of 8 p.s.i., for example, which is established by the regulator valve 121. Once a seal is effected between the beads and the plates, the tire body inflates rapidly. If the inflation bag 27 is used, it will have been withdrawn by evacuation from the previous operation to the position shown in dotted lines in FIG. 4 at the time the tire body is placed on the beads. The bag 27 is then inflated and pressed against the interior of the tire to assure that the contour will be completely circular and that no depression will exist in the tire body due to deformation resulting from spreading of the beads.

The bead plates 18 and 19 are then moved to control the diameter and circumference of the tire body. If the diameter is to be reduced, the operator presses the "forward" button 100 to start the rotation of the screw 28 and separation of the bead plates, the screw being driven from motor 43, LS2 being closed by engagement with the arm of the clutch shift lever 45. Once the moving of the beads begins for the purpose of controlling the tire diameter, the operator watches the pointer 24 and when the diameter of the tire is correct, the operator stops the drive motor 43.

The operator can then release the clutch 44 by moving the shifting lever 45 to the disengaging position. This closes the contacts LS2a of LS2 that have previously been opened and closes a circuit to solenoid 102 which blocks the clutch 44 in open position by interposing the blocking member 103 between the stationary portion of the machine and the blocking dog 48 carried on the shifting lever. This motion, then, frees the arbor for rotation by the tire rotating motor 50.

The operator next moves shifting knob 61 to the high speed position in which a drive is established between sprockets 55 and 62 and thence, through sprocket 65 to the arbor drive sprocket 66. The tire will then rotate rapidly, and during rotation cement for the new tread may be sprayed thereon. If desired, the tire may be previously cemented before being mounted on the machine of the present invention, in which case this initial high speed rotation will be omitted.

After the tire has been mounted and cemented, it is ready to receive the tread stock which has previously been cut and fed along conveyor 69 to the point where the end of the tread stock overlies the last roller 70 of the conveyor. It is undesirable to leave the end of the tread stock unsupported since the unvulcanized rubber has very little resistance to deformation. Therefore, the forward end of the new tread stock must be carefully controlled. The operator sets the tire in slow rotation by moving shifting knob 61 to the low speed position in which a drive is established between sprockets 56 and 63 and thence through sprocket 65 to the arbor drive sprocket 66. The operator then opens valve 130 to admit air to cylinder 72 to raise conveyor 69 for the purpose of bringing the tread stock up against the cemented tire. Because the conveyor roller is cylindrical, the tread stock will adhere to the tire only at the center area and will feed around the tire by reason of the adhesive adherence of the tread stock to the tire body. It is not necessary for the operator to touch the tread stock in any manner during its initial placement on the tire body, except that occasionally some manual adjustment of the adjacent ends of the tread stock fingers 66 may be required. Because the tread stock is adhered only at its center area at this stage, such adjustment and corrections may be readily made.

Once the tread stock has been initially adhered to the tire body, the conveyor 69 may be lowered again to its horizontal position by exhausting the air from cylinder 72 by venting the cylinder through valve 130. Thereafter, the operator steps on the treadle 79, forcing the stitching rollers upwardly to a position in which the new tread stock will engage the cemented surface of the tire. At about the same time the operator moves the handle 61 to shift clutch 57 to the high speed position in which it engages the high speed clutch element 53, establishing a drive connection between sprockets 55 and 62 and then by sprockets 65 and 66 to the arbor so that the tire rotates now at high speed. Pressure on the treadle 79 puts increased pressure on the stitching rollers 73 and 74. The tire is rotated at high speed with the operator increasing the pressure on treadle 79, and thus on the stitching rollers, so that the latter force the new tread stock downwardly against the cemented portion of the tire body, beginning at the center or apex of the conical rollers 73 and 74 and continuing to the outside of the tread stock. This particular stitching motion is known in the art and usefully prevents the existence of any air bubbles between the new tread stock and the periphery of the tire. The inflation pressure in bag 27 makes the tire body firm enough to accept the stitching pressure without distorting the tire body or the unvulcanized tread stock.

Once the new tread stock has been stitched in position, the tire rotation is discontinued by shifting clutch 57 to its neutral position. The air is then vented from the tire body and if the bag 27 is used, the air valve 129 is moved to its evacuating position and the interior of the air bag 27 is brought to a pressure below atmospheric. This brings the flexible material of the air bag 27 into the space between the bead plates 18 and 19 (see dotted line position FIG. 4) so that the completed tire may be easily removed from the bead plates when the latter are brought together by counterrotation of the lead screw 28. The counterrotation of the lead screw 28 is caused, of course, by reverse rotation of drive motor 43 when the operator closes the circuit thereto through the "reverse" button 101. When the air bag 27 is evacuated, valve 129 is moved to its "hold" position C (FIG. 9) and the machine is ready to receive the next prepared tire body.

Once the tire body has been built up with new tread stock, it is inserted into a mold or matrix the diameter of which is selected to closely approximate the diameter of the tire when the new tread stock was applied. An appropriate matrix with a tire mounted therein is shown in cross section in FIG. 2. The matrix there shown includes upper and lower separable matrix halves 131 and 132, held together by a clamp ring 133 which engages peripheral flanges 134 and 135 on the respective matrix halves to form a self-sustaining body. Electrical heating elements 136 furnish heat for the vulcanization step. The tire T is mounted on a conventional inside curing rim 137 and air bag 138 which is inflated after the tire is put into the matrix to force the new tread stock into the interstices of the matrix pattern.

As previously noted, tires of the same nominal size will exhibit a range of size variations both above and below the diameter usually associated with the size marking. The present invention comprises controlling or adjusting all of the tires in the normal range to a predetermined circumference or diameter to accept tread stock of a length equal to the tire circumference. Preferably, the tire body is reduced to a diameter which is equal to or less than the smallest expected or experienced diameter of the normal range. Once the diameter has been established, tread stock is applied that is precut to a predetermined length, since every tire of the same nominal size will be retreaded to the same actual diameter. When the actual diameter to which the tire body is retreaded is smaller than the diameter it had when accepted for retreading, the tire is given a desirable flattened contour from bead to bead and the "tread wave" or accumulation of tread rubber at the entering portion of the tread while the tire is being run on the road is greatly reduced. The heat in the tire is thus reduced because the new tread stock is called upon to flex less than even the original tread stock. The result is that the tire runs cooler and lasts longer when retreaded.

The present invention not only provides for the production of better, longer lasting retreaded tires, but greatly increases the speed of production. At the present time the operations of tire rebuilding with which the invention is concerned take from four to five minutes. The machine above described has a cycle time of about one minute. Further, by applying the same length of tread stock to all tires of the same nominal size which have been adjusted to a tire diameter less than the average, at least a 5 percent saving in the cost of retread stock is effected.

The tire building machine of the present invention is usable not only with small size matrices having a diameter as above described, but also with conventional matrices. When so used, the diameter to be established by movement of the bead plates will be somewhat larger than otherwise, and the precut tread stock will be somewhat longer. As so operated, the machine is usable with existing matrices, but all of the advantages of the invention in its method aspects will not be realized. Certain savings will be effected, however, in view of the possibility of precutting the tread stock and thus making the tire body fit the precut tread stock rather than the reverse, as is presently the case in existing installations.

While the invention has been disclosed in conjunction with a specific form and disposition of the parts, it should be expressly understood that numerous modifications and changes may be made in the apparatus without departing from the spirit and scope of the appended claims.

What I claim is:

1. The method of retreading tires having the same nominal size but which in fact vary in diameter above and below the diameter associated with said nominal size which comprises reducing the diameter of the tire to below the smallest expected variation, pneumatically loading the tire to establish a circular periphery at said reduced diameter, cutting a strip of tread stock to a predetermined length substantially equal to the circumference of the reduced tire, applying the strip of said tread stock to said tire while said tire is held at said reduced diameter, and curing the tread stock in a matrix of approximately the same reduced diameter.

2. The method of retreading tires having the same nominal size but which in fact vary in diameter above and below the diameter associated with said nominal size which comprises reducing the diameter of the tire to below the smallest expected variation, pneumatically loading the tire to establish a circular periphery at said reduced diameter, cutting a strip of tread stock to a predetermined length, and forming interlocking elements on the ends of said tread stock during the cutting operation, applying said tread stock while said tire is held at said reduced diameter, said ends of said tread stock being interlocked during the application thereof, and curing the tread stock in a matrix of approximately the same reduced diameter.

3. The method of retreading tires having the same nominal size but which in fact vary in diameter above and below the diameter associated with the nominal size, which method comprises forming a strip of tread stock of predetermined length, supporting a tire body by its beads, applying pressure to the interior of the tire body while supporting it by the beads, and moving the beads axially of the tire body to establish a circumference of the tire body substantially equal to the length of the strip.

4. Apparatus for retreading tires having the same nominal size but which in fact vary in diameter above and below the diameter associated with said nominal size which comprises, means to reduce the diameter of the tire to below the smallest expected variation, means to pneumatically load the tire to establish a circular periphery thereof at said reduced diameter, means to apply tread stock of predetermined length while said tire is held at said reduced diameter and is pneumatically loaded, and means to cure the tread stock in a matrix, said matrix having approximately the same reduced diameter.

5. The combination of elements defined in claim 4 and means to interdigitate the ends of said new tread stock around said tire.

6. Apparatus for retreading tires comprising a machine base having an upright frame member, a rotatable tubular arbor journaled in said upright frame member, an arbor drive motor, clutch means to establish high speed and low speed driving connections between said arbor drive motor and said arbor, inner and outer tire bead engaging plates carried by said arbor and movable axially thereof, means having drive elements disposed within said arbor to move said bead engaging plates toward and away from each other, said means imparting an equal and opposite axial movement to each bead plate with respect to a common perpendicular plane, means to lock said arbor against rotation during bead plate adjustment, an air inflatable bag having sealed engagement with each of said bead plates, means to inflate said bag and means to collapse said bag to a diameter smaller than the diameter of said bead plates to facilitate loading and unloading of a tire thereon, said bead plates acting to receive a tire prepared for retreading, said tire being engaged by said bead plates and being reduced in diameter by spreading said bead plates apart, tread stock receiving means associated with said machine and centered with relation to said common perpendicular plane to receive new tread stock for application to a tire engaged by said bead plates, means to move said tread stock receiving means toward said tire to force tread stock carried thereby into engagement with said prepared tire body equally on each side of said common perpendicular plane, means to rotate said arbor and said tire while said means is in position to force said tread stock against said tire whereby said new tread stock is fed around said tire over at least the road engaging surface thereof, and stitching rollers carried by said frame and operable to force at least the edges of said tread stock into engagement with said tire, said arbor and tire being rotated at high speed during the operation of said stitching rollers.

7. Apparatus in accordance with claim 6 in which said tread stock receiving means includes an end roller movable into engagement with said tire.

8. Apparatus in accordance with claim 6 in which said tread stock receiving means includes a roller conveyor having an end roller movable into engagement with said tire.

9. Apparatus for retreading tires having the same nominal size but which in fact vary in diameter above and below the diameter associated with said nominal size comprising, a machine base having an upright frame member, a rotatable, tubular arbor journaled in said upright frame member, an arbor drive motor, clutch means to establish high speed and low speed driving connections between said arbor drive motor and said arbor, inner and outer tire bead engaging plates carried by said arbor and movable axially thereof, means having drive elements disposed within said arbor to move said bead plates toward and away from each other, said means imparting an equal and opposite axial movement to each bead plate with respect to a common perpendicular plane, means to lock said arbor against rotation during bead plate adjustment, an air inflatable bag having sealed engagement with each of said bead plates, means to inflate said bag and means to collapse said bag to a diameter smaller than the diameter of said bead plates, said bead plates acting to receive a tire prepared for retreading, said tire being engaged by said bead plates and being reduced in diameter by spreading said bead plates apart, means to indicate the instantaneous diameter of a tire spread by said bead plates, whereby said prepared tire may be reduced in diameter to a diameter below the smallest expected variation in diameter from the diameter associated with said nominal size, means to feed new tread stock around said tire over at least the road-engaging surface thereof when said tire has been reduced in diameter, means carried by said frame to engage said tread stock and force same into a predetermined position around said tire over an area greater than the road-engaging surface thereof, said last means comprising spring biased manually operable rollers, said inflatable bag being inflated during operation of said last means to provide a firm resistance to pressure applied by said rollers, a source of air under pressure, valve means to control the flow of air to and from said inflatable bag from said air source, and venturi means connectable by said valve means to said bag and to said air source to create a negative, bag collapsing pressure within said bag after said new tread stock has been applied to said tire whereby said tire is readily removable from said bead plates and said bead plates are exposed for reception of another prepared tire body.

10. Apparatus for retreading tires comprising a machine base having an upright frame member, a rotatable tubular arbor journaled in said upright frame member, an arbor drive motor, clutch means to establish high speed and low speed driving connections between said arbor drive motor and said arbor, inner and outer tire bead engaging plates carried by said arbor and movable axially thereof, means having drive elements disposed within said arbor to move said bead engaging plates toward and away from each other, said means imparting an equal and opposite axial movement to each bead plate with respect to a common perpendicular plane, means to lock said arbor against rotation during bead plate adjustment, means for placing the interior of the tire under pressure, said bead plates acting to receive a tire prepared for retreading, said tire being engaged by said bead plates and being changed in diameter by movement of said bead plates, tread stock receiving means associated with said machine and centered with relation to said common perpendicular plane to receive new tread stock for application to a tire engaged by said bead plates, means to move said tread stock receiving means toward said tire to force tread stock carried thereby into engagement with said prepared tire body equally on each side of said common perpendicular plane, means to rotate said arbor and said tire while said means is in position to force said tread stock against said tire whereby said new tread stock is fed around said tire over at least the road-engaging surface thereof, and stitching rollers carried by said frame and operable to force at least the edges of said tread stock into engagement with said tire, said arbor and tire being rotated at high speed during the operation of said stitching rollers.

11. Apparatus for retreading tires having the same nominal size but which in fact vary in diameter above and below the diameter associated with said nominal size comprising, a machine base having an upright frame member, a rotatable, tubular arbor journaled in said upright frame member, an arbor drive motor, clutch means to established high speed and low speed driving connections between said arbor drive motor and said arbor, inner and outer tire bead engaging plates carried by said arbor and movable axially thereof, means having drive elements disposed within said arbor to move said bead plates toward and away from each other, said means imparting an equal and opposite axial movement to each bead plate with respect to a common perpendicular plane, means to lock said arbor against rotation during bead plate adjustment, means for placing the interior of the tire under pressure, said bead plates acting to receive a tire prepared for retreading, said tire being engaged by said bead plates and being changed in diameter by movement of said bead plates, means to indicate the instantaneous diameter of a tire held by said bead plates, whereby said prepared tire may be controlled to a predetermined diameter, means to feed tread stock around said tire over at least the road engaging surface thereof when said tire has been controlled to the diameter, and means carried by said feed means to engage said tread stock and force same into a predetermined position around said tire.

12. Apparatus for retreading tires having the same nominal size but which in fact vary in diameter above and below the diameter associated with said nominal size, said apparatus comprising means for forming a strip of tread stock of predetermined length, means for supporting a tire body by its beads and in alignment with the tread stock, means for applying pressure internally of the tire body while held by said supporting means in alignment with the tread stock, and means for moving said bead-support means axially of the tire body to move the beads accordingly and to establish a circumference of the tire body substantially equal to the length of the tread stock strip.

13. Apparatus according to claim 12 wherein said bead-support moving means moves said beads symmetrically to maintain the tire body aligned with the strip of tread stock.

References Cited

UNITED STATES PATENTS

| | | | |
|---|---|---|---|
| 2,178,984 | 11/1939 | Zimmerman | 156—304 X |
| 2,282,579 | 5/1942 | Hawkinson | 156—96 |
| 2,282,580 | 5/1942 | Hawkinson | 156—96 |
| 2,292,286 | 8/1942 | Owen | 156—96 |
| 3,251,722 | 5/1966 | Holman | 156—130 |
| 3,308,000 | 3/1967 | Holman | 156—130 X |

HAROLD ANSHER, *Primary Examiner.*